US008805856B2

(12) United States Patent
Bai et al.

(10) Patent No.: US 8,805,856 B2
(45) Date of Patent: *Aug. 12, 2014

(54) MERCHANDISE HIERARCHY REFINEMENT BY INCORPORATION OF PRODUCT CORRELATION

(71) Applicant: International Business Machines Corporation, Armonk, NY (US)

(72) Inventors: Xin Xin Bai, Beijing (CN); Jin Dong, Beijing (CN); Ts-Hsin Li, Yorktown Heights, NY (US); Zhong Lin Lin, Beijing (CN); Hai Rong Lv, Beijing (CN); Wen Jun Yin, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/729,997

(22) Filed: Dec. 28, 2012

(65) Prior Publication Data

US 2013/0117165 A1 May 9, 2013

Related U.S. Application Data

(63) Continuation of application No. 12/636,444, filed on Dec. 11, 2009, now Pat. No. 8,346,783.

(51) Int. Cl.
*G06F 7/00* (2006.01)
*G06F 17/30* (2006.01)

(52) U.S. Cl.
USPC .......... 707/751

(58) Field of Classification Search
USPC .......... 707/751
See application file for complete search history.

(56) References Cited

U.S. PATENT DOCUMENTS

2002/0147630 A1 10/2002 Rose et al.

*Primary Examiner* — Alexey Shmatov

(74) *Attorney, Agent, or Firm* — Scully, Scott, Murphy & Presser, P.C.; Daniel P. Morris, Esq.

(57) ABSTRACT

A system for adjusting a representation of a merchandise hierarchy associated with an entity such as a retailer or wholesaler of products. Product correlation information discovered in that entity's customers' shopping records are obtained and incorporated into an existing merchandise hierarchy with a constraint on the consistency with the existing hierarchy.

6 Claims, 6 Drawing Sheets

300

301 302

| TRANSACTION ID | MERCHANDISE CATEGORY | | |
| --- | --- | --- | --- |
| | BREAD 303 | MILK 304 | FRUIT 305 |
| 1 | 1 | 1 | 0 |
| 2 | 0 | 1 | 1 |
| 3 | 0 | 1 | 0 |
| 4 | 1 | 1 | 1 |
| 5 | 0 | 1 | 0 |

FIG. 3

MERCHANDISE HIERARCHY REFINEMENT BY INCORPORATION OF PRODUCT CORRELATION

CROSS-REFERENCE TO RELATED PATENT APPLICATIONS

The present disclosure is a continuing application of and claims the benefit of commonly-owned, co-pending U.S. patent application Ser. No. 12/7636,444 filed Dec. 11, 2009, the entire contents and disclosure of each of which is expressly incorporated by reference herein as if fully set forth herein.

BACKGROUND

The present invention is related generally to hierarchical organization of an entity's merchandise, i.e., product/inventory, and more specifically, to a method and system for merchandise hierarchy refinement by incorporating product correlation. More specifically, the present invention relates to a method and system of incorporating product correlation information discovered in customers' shopping profiles (records) to adjust an existing merchandise hierarchy with a constraint on the consistency with the existing hierarchy.

Merchandise hierarchy is a tree-like structure for organizing merchandise categories and products of an entity, e.g., a product wholesaler/retailer. It plays a key role in the business decision-making process. First, merchandise hierarchy is the base of management and operation structure: departments are usually organized according to the merchandise hierarchy and are responsible for all business related but sub-categories and products under the category, e.g., procurement, forecasting, shelf layout, etc. Moreover, merchandise analytics at levels defined in the hierarchy are the basis of business strategy adjustment, such as statistics, reporting, performance evaluation, etc.

Currently, there is no mechanism for incorporating customers' shopping behavior (e.g., a shopping profile or history) in such merchandise analytics. Such information is useful to facilitate improvement of the business structure and make it truly customer-oriented.

SUMMARY

The present invention is a system and method for refining an entity's merchandise hierarchy, particularly by generating a more comprehensive merchandise hierarchy for an entity (e.g., a product retailer or wholesaler) that incorporates information representing the shopping behavior of customer(s).

According to one aspect of the invention, there is provided a method of merchandise hierarchy refinement comprising: extracting first data representing a predetermined merchandise hierarchy and second data representing transaction records having a plurality of transactions related to a plurality of products; clustering the plurality of products based on the plurality of transactions; and updating the predetermined merchandise hierarchy representation based on the clustering, wherein a program using a processor unit performs one or more of the extracting, clustering and updating.

Further to this aspect of the invention, the step of clustering comprises: setting a current level of the merchandise hierarchy as a bottom level of the merchandise hierarchy, initializing a new membership matrix to an existing membership matrix; applying a Genetic Algorithm to minimize an objective function, wherein in each step of the Genetic Algorithm, a new generation group of the new membership matrix satisfies a consistency constraint; repeating the initializing and applying at a next upper level of the current level until a next highest level of the merchandise hierarchy is reached; and outputting the new membership matrix.

The comprehensive merchandise hierarchy helps to improve the business structure and make it truly customer-oriented which will, in turn, increase customer's satisfaction, improve operational efficiency, and reduce the cost of management.

BRIEF DESCRIPTION OF THE DRAWINGS

The accompanying drawings are included to provide a further understanding of the present invention, and are incorporated in and constitute a part of this specification. The drawings illustrate embodiments of the invention and, together with the description, serve to explaining the principles of the invention. In the drawings.

FIG. 3 illustrates an example of a transaction record data table;

DETAILED DESCRIPTION

Figure 1:
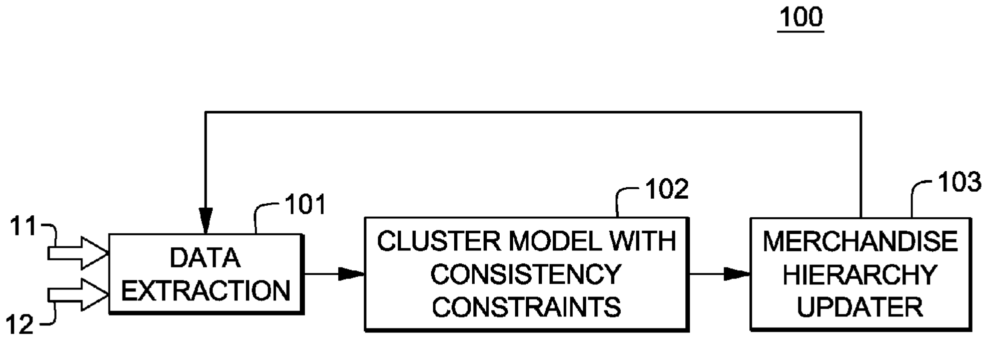
FIG. 1 illustrates an overview of the system and method for merchandise hierarchy refinement according to a preferred embodiment of the present invention.

FIG. 1 illustrates an overview of a system and computer-implemented method 100 for merchandise hierarchy refinement according to a preferred embodiment of the present invention. In the system 100, there is employed at least three processing modules: a data extraction module 101, a cluster model with consistency constraints module 102, and a merchandise hierarchy updater module 103.

The data extraction module (101) receives two data feeds: a first data input 11 for receiving data representing a predefined merchandise hierarchy; and, second data input 12 for receiving customers' transaction records. As will be described, the received customer transaction records are preprocessed by the data extraction module 101 to obtain item similarity.

The cluster model with consistency restraints 102 performs clustering over the items of each level of merchandise hierarchy by adding consistency restraints based on a ratio of mutual information.

The merchandise hierarchy updater 103 performs updating of the corresponding items and updating of the links between the corresponding levels of merchandise hierarchy.

Figure 2:
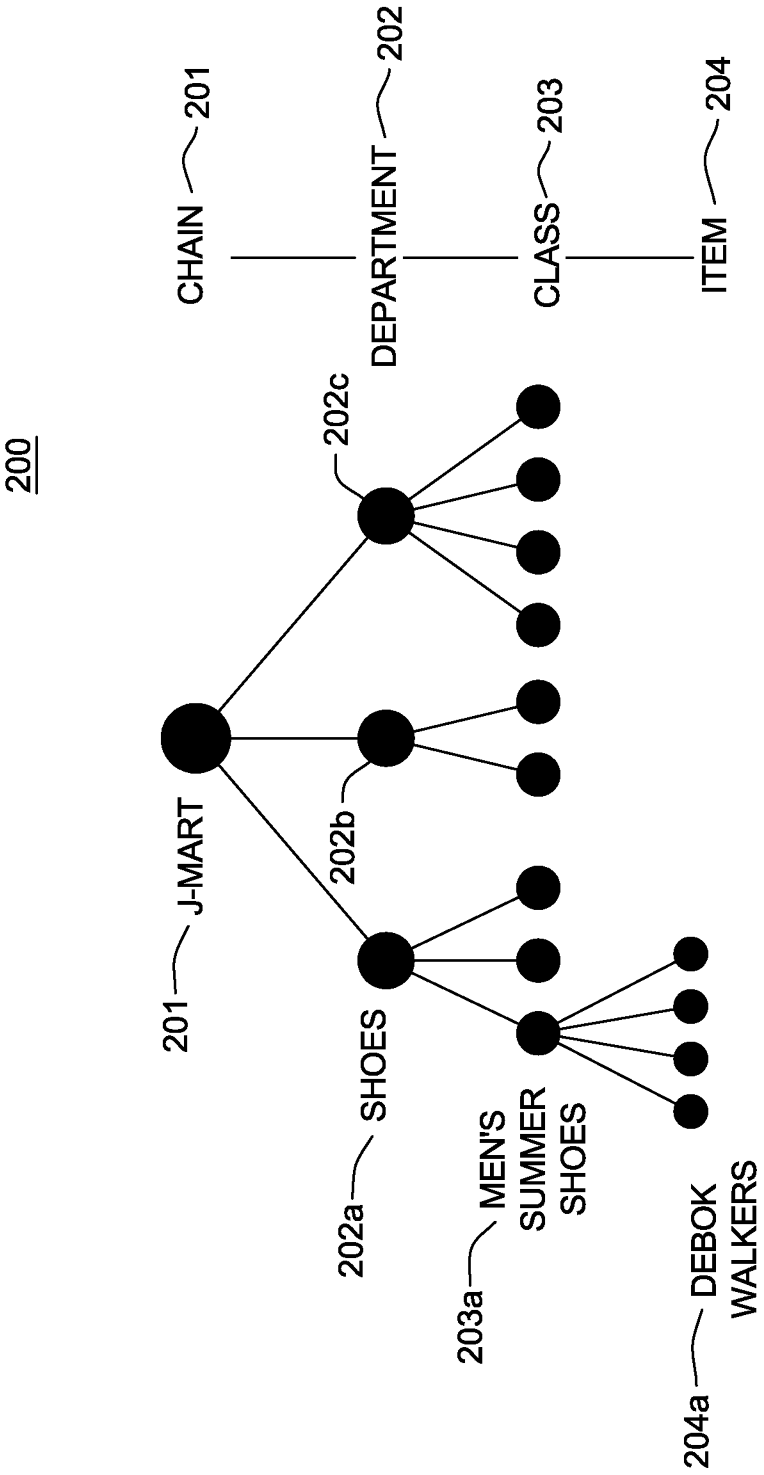
FIG. 2 illustrates an example of a predefined merchandise hierarchy.

FIG. 2 illustrates an example of a predefined merchandise hierarchy 200 having a tree-like structure that comprises the first data input 11 to the data extraction module (101). In particular, any common hierarchical tree representation can be input that includes representation of nodes, e.g., with pointers to their children, their parents, or both, or as items in an array with relationships between them determined by their positions in the array is input. For purposes of discussion, the merchandise hierarchy 200 is provided for an example merchandise retail entity, e.g., "J-mart," which may be a chain of retail stores. The chain J-Mart (201) is arranged in a hierarchical manner with the top node of the tree 201 indicating the retail entity (chain). The retail entity at the top node is divided into several departments 202, indicated as child nodes 202*a*, 202*b*, 202*c*. As shown in FIG. 2, for example, a first child node represents a Shoes department (202*a*). Departments in the hierarchy are further divided into classes 203. For example, as shown in FIG. 2, the Shoes department (202*a*) is further divided into classes including a Men's summer shoes class (203*a*). Classes 203 in the hierarchy are further divided into items 204. For example, Men's summer shoes class 203*a* in the hierarchy includes products of merchandise such as the walker shoes (204*a*).

FIG. 3 presents an example of a transaction record data table 300 that comprises the second data input 12 to the data extraction module (101). FIG. 3 in particular gives the attributes of a transaction record, and these records with attributes are stored into a database or like memory storage structure. The example table includes main attribute columns: Transaction ID (301) and Merchandise Category (302). Merchandise Category column 302 includes items or products of the retailer that may have been subject to purchase in particular customers' transactions (indicated by the Transaction ID). For example, the merchandise category shown in FIG. 3 indicates three products: bread (303), milk (304) and fruit (305) for the merchandise category. In the transaction record data table 300, for each transaction, a '1' entry in the column represents that the product is bought and '0' represents that the product is not bought. Note that the times any two products are bought together are counted as similarities between the two products. In this example table, it can be seen that milk and bread are bought together 2 times, milk and fruit are bought together 2 times, and bread and fruit are bought together 1 time. Intuitively, the more times two products are bought together, the more they complement each other.

As mentioned, the data extractor module 101 preprocesses the received customer transaction records to generate item similarities, i.e., a similarities count.

This similarities count data is input to the cluster model with consistency constraints module (102) in FIG. 1. The similarities are real numbers without complex data structures, and the manner in which they are calculated is explained in greater detail herein below. The cluster model with consistency constraints (102) in FIG. 1 performs clustering over products of each level of the merchandise hierarchy by adding consistency constraints based on a ratio of mutual information between the predefined merchandise hierarchy and the refined hierarchy that reflects their difference. Thus, in this phase (102), the merchandise hierarchy has been refined.

First, the notations used in the clustering model implemented by the consistency constraints module (102) are introduced as follows:

N=number of products (e.g., $N_{i+1}$ is the number of products of the level i+1 that is determined by predefined merchandise hierarchy);

M=number of original categories;

K=number of new categories;

$W=\{W_{ij}\}$=N×N similarity matrix;

$D=\text{diag}\ \{d_1, \ldots, d_N\}$, where $d_i=\Sigma_j W_{ij}$;

C=N×K new member matrix, wherein $C_i$=ith row of C;

T=existing category labels defined by the existing hierarchy (e.g., Tij=1 whenever product i belongs to category j. Otherwise, Tij=0. The size of matrix T is subject to the existing hierarchy that may be different from the size of C);

$p_{ij}$=fraction of sales volume of products in new category i and existing category j;

$p_i^*=\Sigma_j p_{ij}$=fraction of sales volume of products in new category I;

$p^*_j=\Sigma_i p_{ij}$=fraction of sales volume of products in existing category j;

$$H(T) = -\sum_{j=1}^{M} p_j^* \log(p_j^*) = \text{Shannon entropy of } T;$$

$$I(C, T) = \sum_{i=1}^{K}\sum_{j=1}^{M} p_{ij}\log\left(\frac{p_{ij}}{p_i^* \times p_j^*}\right) = \text{the mutual information between } C \text{ and } T;$$

Q(C,T)=H(T)/I(C,T)=ratio of mutual information;

η≥1=control parameter.

It is understood that data N, M, D, K, W, p, H( ) I( ) Q( ) are extracted from the transaction records.

Using the definitions given above, finding a clustering assignment operation is performed whereby each product is assigned a cluster label, i.e. the output matrix C, such that similar items have similar assignments is tantamount to finding a solution to the new member matrix "C" which satisfies the following objective function:

$$\min \sum_{i,j=1}^{N} W_{ij}\|C_i - C_j\|^2 = \text{trace}(C^T(D - W)C),$$

such that Q(C,T)≥η.

The objective function which makes use of the complementary information between products means that similar products have similar cluster assignments. A description of a clustering technique that can be used is presented herein below in greater detail.

The consistency constraint leverages expertise to control the extent of hierarchy change. It can be found that Q(C,T) is minimized to 1 if and only if the sales distributions with the new and existing categories are identical. The higher the confidence level of the predefined merchandise hierarchy, i.e., the confidence level that can be mirrored by parameter η and adopted to only show the degree of belief in the predefined merchandise hierarchy, the smaller the value of η. In practice, the confidence level of predefined hierarchy is determined by tuning the control parameter η which is a presupposed positive constant based on the expertise to predefined merchandise hierarchy (i.e. its confidence level) before clustering. Hence, for a given η the whole bottom-up process is performed once.

Accordingly, in one embodiment, an optimization algorithm is implemented for the cluster model with the following consistency constraints: Initialization: C=T. The algorithm includes:

1. Applying a Genetic Algorithm (GA) (e.g., see reference to Holland, John H entitled Adaptation in Natural and Artificial Systems, University of Michigan Press, Ann Arbor (1975), incorporated by reference herein) to minimize the objective function. Generally, GA algorithms are implemented in a computer simulation in which a population of abstract representations of candidate solutions to an optimization problem evolves toward better solutions. The evolution usually starts from a population of randomly generated individuals (binary representation) and happens in generations. In each generation (iteration), multiple individuals are stochastically selected from the current population based on their fitness (i.e. the corresponding value of objective function), and modified (recombined and randomly mutated) to form a new population that is then used in the next iteration. Commonly, the algorithm terminates when either a maximum number of generations has been produced, or a satisfactory fitness level has been reached. However, slightly different from the above original GA, in each iteration of the present method, it is demanded that the new generation group of variable C must satisfy the consistency constraints. Hence, in each generation those individuals breaking consistency constraints must be removed.

2. Output the final cluster assignments C, i.e., the matrix C is just the structure output. Cij=1 means product i belongs to category j and otherwise Cij=0. Therefore, the refined merchandise hierarchy may be re-drawn in terms of C such as described herein with respect to FIG. 4.

The final cluster assignments C are output to the Merchandise Hierarchy updater (103) as shown in FIG. 1, which updates the clustering of the corresponding items according to the result computed by the Cluster Model, and updates the links between the corresponding levels of the merchandise hierarchy such as the merchandise hierarchy 200 shown in FIG. 2.

Figure 4:
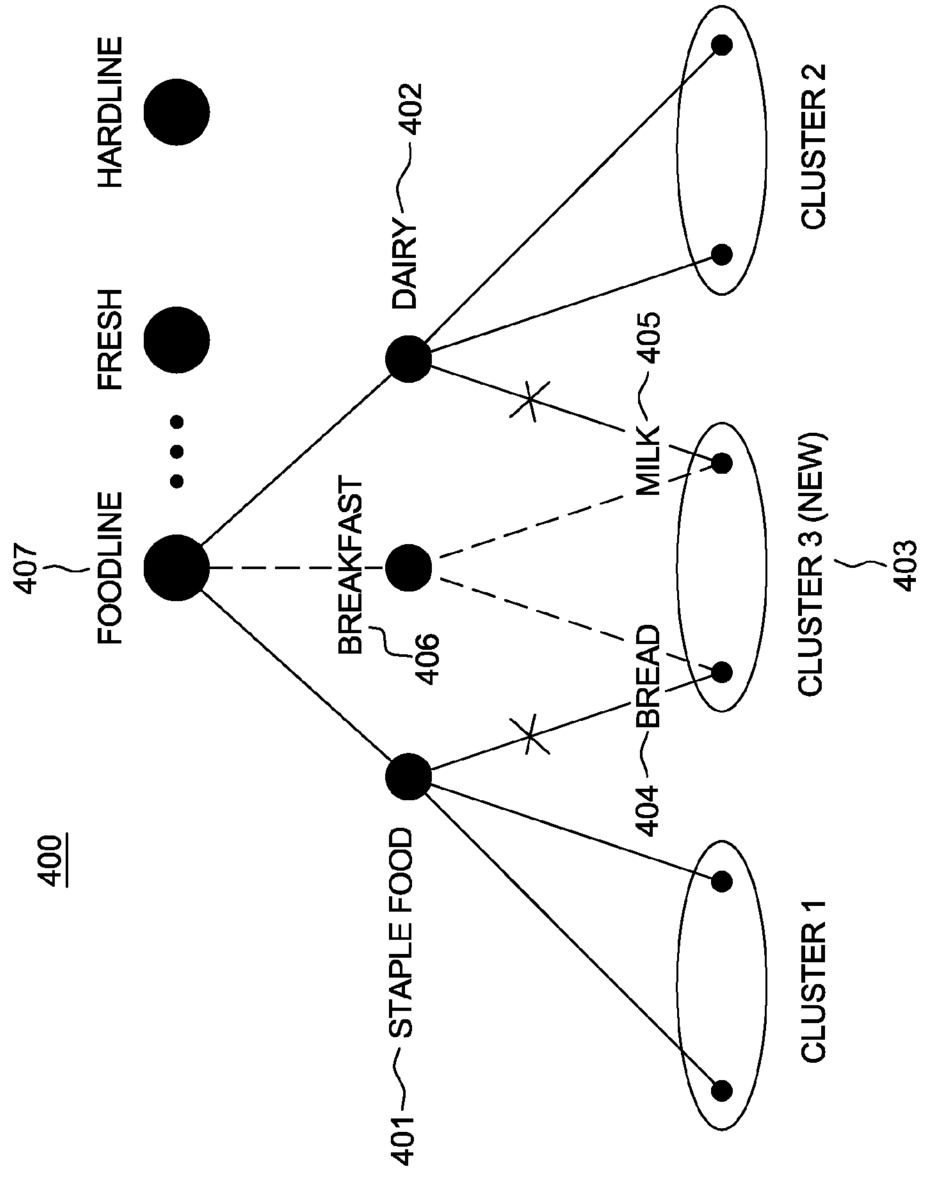
FIG. 4 illustrates an example of the refined merchandise hierarchy based on the transaction record data illustrated in FIG. 3, according to one embodiment.

FIG. 4 shows an example of updates 400 performed by the Merchandise Hierarchy Updater module 103. As shown in FIG. 4, the original categories in the middle level only included Staple food (401) and Dairy (402). After implementing the cluster modeling performed by module 102, besides two existing categories, a new category 'Cluster 3' (403) is generated according to cluster assignments. The new category contains two products bread (404) and milk (405) that originally belong to the Staple food (401) and Dairy (402) respectively Here, Merchandise Hierarchy Updater performs three things: first, give Cluster 3 a title, e.g. Breakfast (406) that is in accordance with the meanings of bread and milk and create a new category node Breakfast; second, discard the links from bread to Staple food (401) and from milk to Dairy (402), and add links from bread and milk to Breakfast (406); third, add a link from Breakfast (406) to its upper level nodes, e.g. create a link from Breakfast to Foodline (407).

In summary, a bottom-up strategy to adjust the predefined merchandise hierarchy is adopted. The method implementing the strategy in the Merchandise Hierarchy Updater module 103 is as follows:

1) choose a starting level in the existing hierarchy;
2) sequentially implement the three modules: the data extractor, the cluster model with consistency constraints and the merchandise hierarchy updater;
3) return to perform the second step on the upper category level of the current level;
4) output the refined merchandise hierarchy until the next highest level is reached.

Figure 5:
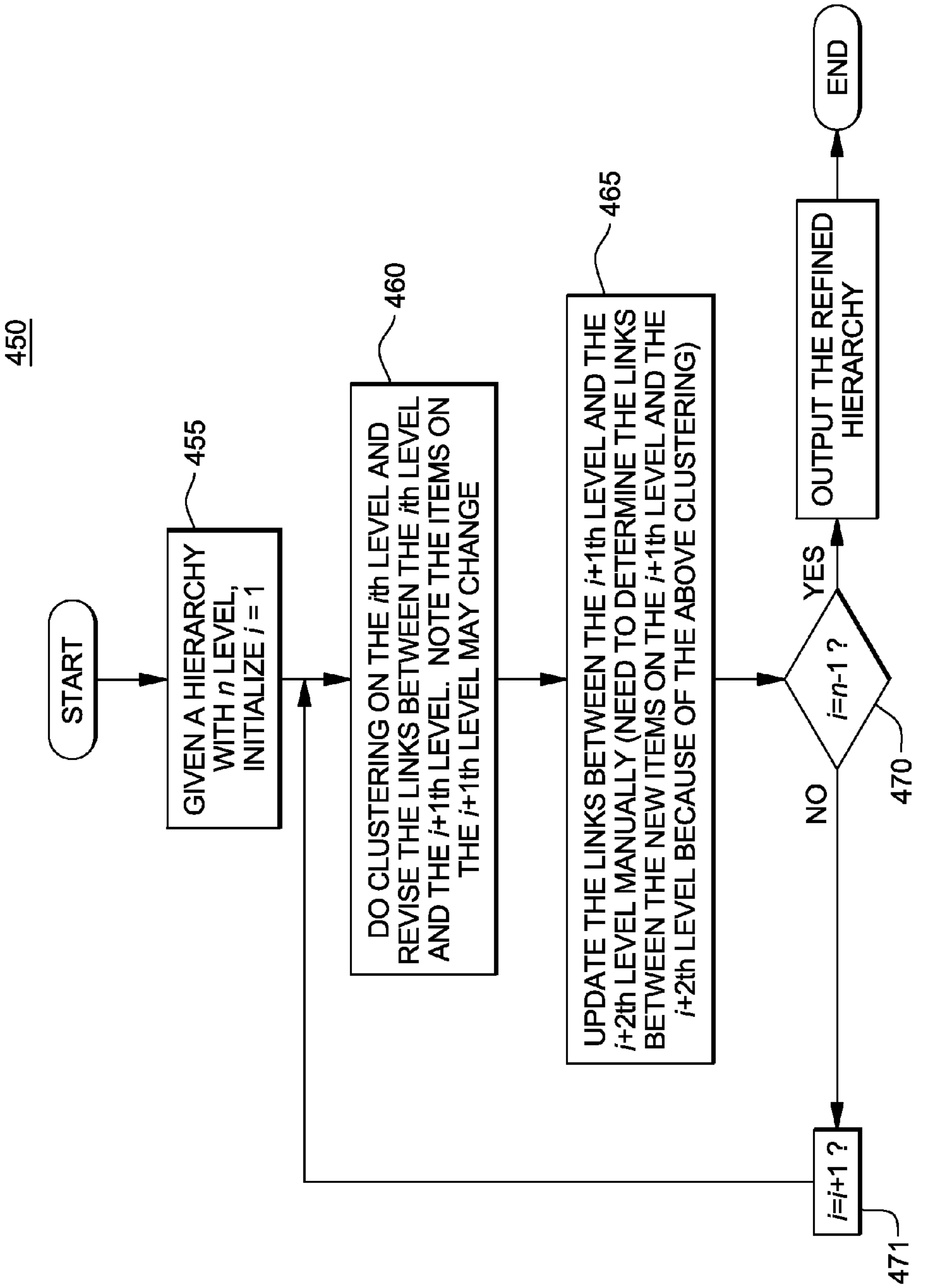
FIG. 5 illustrates the flow chart for the method for the merchandise hierarchy refinement; and, FIG. 6 illustrates an exemplary hardware configuration for implementing the flow charts depicted in FIGS. 1 and 5 according to one embodiment of the present invention.

FIG. 5 illustrates a flow chart for the method 450 for the merchandise hierarchy refinement according to the present invention. In step 455, given a hierarchy with n levels, the method includes: setting the bottom level as the current level (i.e. set current level as level i and initialize i=1). In step 460, the clustering method is performed on the current level i and the links between the current level i and the upper level i+1 are performed. In step 465, the links between the upper level i+1 and the next upper level I+2 are updated. After the updates in step 465, a determination is made as to whether the current value is the next highest level in step 470. If the current level is not the next highest level, then the upper level is set as the current level at 471 and the clustering updating in steps 460 and 465 are repeated; otherwise, the refined hierarchy is output at 475 and the process terminates. The updating of the predetermined merchandise hierarchy representation thus includes adding a new node and corresponding link connecting the new node to a parent node of said first lower or second next lower level node.

In one example, as a result of implementing the present invention, the comprehensive merchandise hierarchy helps to improve the business structure and make it truly customer-oriented which will, in turn, increase customer's satisfaction, improve operational efficiency, and reduce the cost of management. For example, a new category may be created for young mothers that often buy products for themselves together with products for their baby, and baby products are no longer separately located in individual categories, such as baby milk in the diary department, or baby clothing in clothing department.

Figure 6:
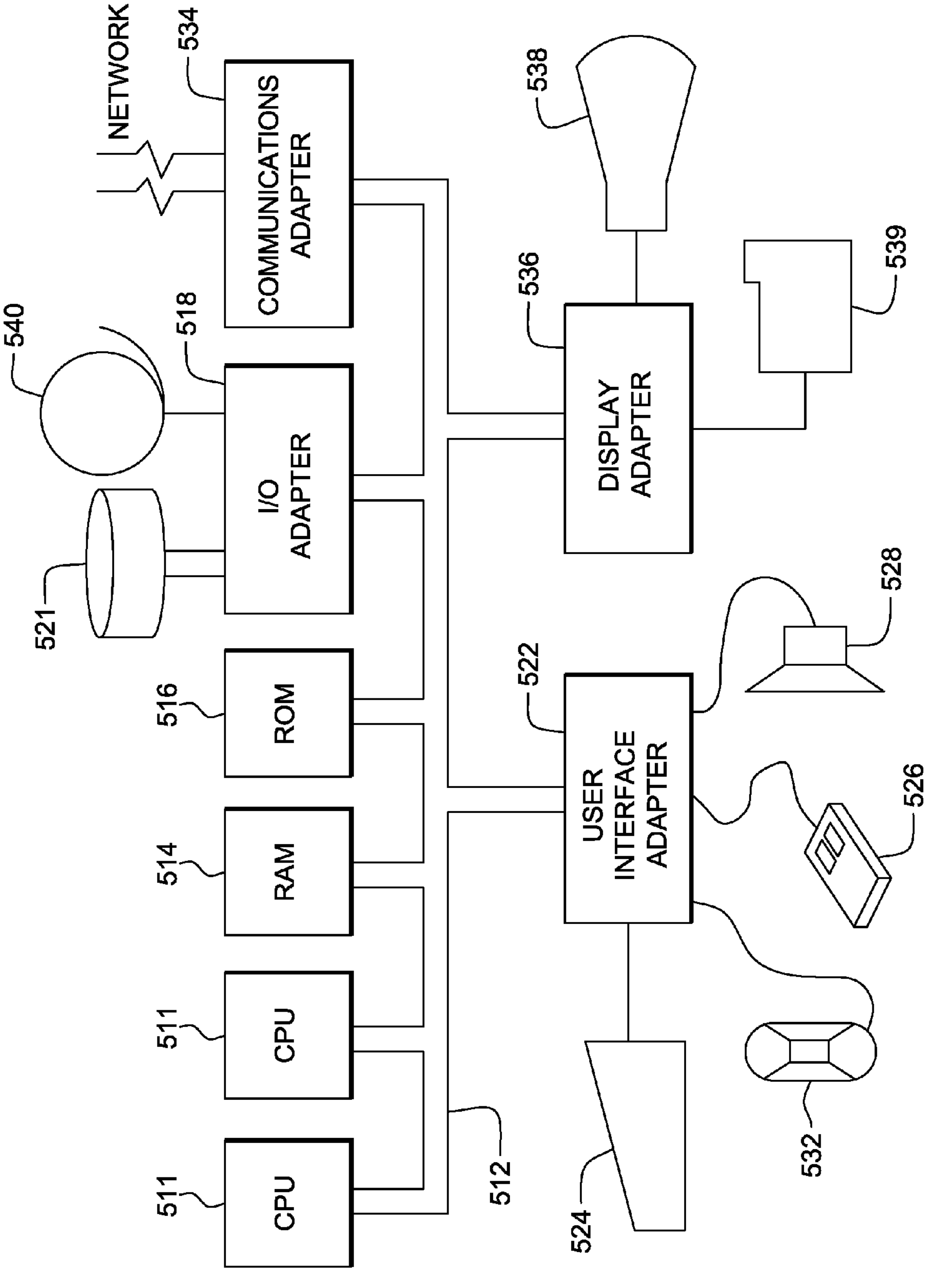

FIG. 6 illustrates an exemplary hardware configuration of a computing system 500 running and/or implementing the method steps in FIGS. 1 and 5. The hardware configuration preferably has at least one processor or central processing unit (CPU) 511. The CPUs 511 are interconnected via a system bus 512 to a random access memory (RAM) 514, read-only memory (ROM) 516, input/output (I/O) adapter 518 (for connecting peripheral devices such as disk units 521 and tape drives 540 to the bus 512), user interface adapter 522 (for connecting a keyboard 524, mouse 526, speaker 528, microphone 532, and/or other user interface device to the bus 512), a communication adapter 534 for connecting the system 500 to a data processing network, the Internet, an Intranet, a local area network (LAN), etc., and a display adapter 536 for connecting the bus 512 to a display device 538 and/or printer 539 (e.g., a digital printer of the like).

Although the embodiments of the present invention have been described in detail, it should be understood that various changes and substitutions can be made therein without departing from spirit and scope of the inventions as defined by the appended claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A typical combination of hardware and software could be a general purpose computer system with a computer program that, when being loaded and run, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to affect one or more functions of this invention. Furthermore, the present invention may be implemented as a program storage device readable by machine, such as a processing device, microprocessor, processor unit, etc., tangibly embodying a program of instructions operated by the machine to perform method steps for causing one or more functions of this invention.

The present invention may be implemented as a computer readable medium (e.g., a compact disc, a magnetic disk, a hard disk, an optical disk, solid state drive, digital versatile disc) embodying program computer instructions (e.g., C, C++, Java, Assembly languages, Net, Binary code) run by a processor (e.g., Intel® Core™, IBM® PowerPC®) for causing a computer to perform method steps of this invention. The present invention may include a method of deploying a computer program product including a program of instructions in a computer readable medium for one or more functions of this invention, wherein, when the program of instructions is run by a processor, the computer program product performs the one or more of functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A system for of merchandise hierarchy refinement comprising:

a memory storage device;

a processor unit in communication with said memory storage device, said processor unit configured to perform a method comprising:

extracting first data from a predetermined merchandise hierarchy represented as a tree data structure of nodes interconnected by links wherein one or more products at a lowest level node of said hierarchy are assigned as being a member of a category at an upper category level node of said hierarchy and include a link to that category level node, and second data representing transaction records having a plurality of transactions related to the plurality of products;

clustering said plurality of products based on said plurality of transactions in which a new cluster is generated relating to products of said plurality; and updating the predetermined merchandise hierarchy representation based on said clustering in which said products of said new cluster are assigned as being members of a new category level node, and a new link generated for connecting the products and corresponding new category level node, wherein said clustering comprises:

initializing a new membership matrix as representing categories and their member product assignments according to a lowest level of said predefined merchandise hierarchy;

performing, via a computer simulation, an iterative process to minimize an objective function relating a similarity of complementary information between said plurality of products, wherein at each iteration, assigning each product to a cluster label such that similar items have similar assignments to update said new membership matrix and form a refined merchandise hierarchy that satisfies a consistency constraint based on a ratio of mutual information representing a difference between the predefined merchandise hierarchy and the refined merchandise hierarchy;

repeating said initializing and performing at a next upper level until a next highest level of said refined merchandise hierarchy is reached; and outputting said new membership matrix.

2. The system of claim 1, wherein said objective function is:

$$\min \sum_{i,j=1}^{N} W_{ij} \|C_i - Cj\|^2 = \mathrm{trace}(C^T (D - W) C),$$

wherein $W=\{W_{ij}\}$ is an N×N similarity matrix, $D=\mathrm{diag}\{d_1, \ldots, d_N\}$, wherein $d_i=\Sigma_j W_{ij}$, C is a N×K new member matrix, wherein $C_i$=ith row of C and Cj=jth row of C, $C^T$ is a transpose matrix of C, N is a number of products in a current level of said predetermined merchandise hierarchy, and K is a number of new categories in a current level of said predetermined merchandise hierarchy.

3. The system of claim 2, wherein said consistency constraint based on a ratio of mutual information is computed as:

$$Q(C, T) = H(T) / I(C, T), \text{ wherein } H(T) = -\sum_{j=1}^{M} p_j^* \log(p_j^*),$$

$$I(C, T) = \sum_{i=1}^{K} \sum_{j=1}^{M} p_{ij} \log\left(\frac{p_{ij}}{p_i^* \times p_j^*}\right) = \text{the mutual information between } C \text{ and } T;$$

and, wherein

C is a N×K new member matrix,

T is an existing category labels matrix defined by the existing hierarchy, $p_{ij}$ is a fraction of sales volume of products in new category i and existing category j, $p_i^*=\Sigma_j p_{ij}$=fraction of sales volume of products in new category i $p^*_j=\Sigma_i p_{ij}$=fraction of sales volume of products in existing category j, N is a number of products in a current level of said predetermined merchandise hierarchy, M is a number of original categories in a current level of said predetermined merchandise hierarchy, and K is a number of new categories in a current level of said predetermined merchandise hierarchy.

4. The system of claim 3, wherein said first data representing predetermined merchandise hierarchy including said tree data structure includes a top level node, representing a top of said hierarchy, and a first lower hierarchy level including one or more first lower level nodes connected to said top node by respective links, and a second lower hierarchy level including one or more second lower level nodes connected to a node of said first lower level nodes via links, said updating the predetermined merchandise hierarchy representation comprising adding a new node and link connecting to a node of said first lower or second next lower level node.

5. The system of claim 4, wherein said new membership matrix output includes cluster assignments C used for updating the nodes and links in said predetermined merchandise hierarchy representation.

6. The system of claim 5, wherein said iterative process includes applying a Genetic Algorithm.

* * * * *

UNITED STATES PATENT AND TRADEMARK OFFICE

CERTIFICATE OF CORRECTION

PATENT NO. : 8,805,856 B2
APPLICATION NO. : 13/729997
DATED : August 12, 2014
INVENTOR(S) : Xin Xin Bai et al.

It is certified that error appears in the above-identified patent and that said Letters Patent is hereby corrected as shown below:

On the Title Page

It Should Read:

(72) Inventor(s): Xin Xin Bai, Beijing (CN); Jin Dong, Beijing (CN); Ta-Hsin Li, Yorktown Heights, NY (US); Zhong Lin Lin, Beijing (CN); Hai Rong Lv, Beijing (CN); Wen Jun Yin, Beijing (CN)

Signed and Sealed this
Third Day of March, 2015

Michelle K. Lee
*Deputy Director of the United States Patent and Trademark Office*